United States Patent
Cho et al.

(10) Patent No.: US 9,897,177 B2
(45) Date of Patent: Feb. 20, 2018

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Sueng Ho Lee, Seoul (KR); Jae Chang Kook, Hwaseong-si (KR); Dong Hwan Hwang, Seoul (KR); SeokJin Kim, Hwaseong-si (KR); Seongwook Ji, Ansan-si (KR); Hyun Sik Kwon, Seoul (KR); JongSool Park, Hwaseong-si (KR); KyeongHun Lee, Seoul (KR); Seong Wook Hwang, Gunpo-si (KR)

(73) Assignee: Hyundai Motor Company, Seoul (KR)

(*) Notice: Subject to any disclaimer, the term of this patent is extended or adjusted under 35 U.S.C. 154(b) by 88 days.

(21) Appl. No.: 14/947,630

(22) Filed: Nov. 20, 2015

(65) Prior Publication Data

US 2017/0074374 A1    Mar. 16, 2017

(30) Foreign Application Priority Data

Sep. 14, 2015 (KR) .................. 10-2015-0129862

(51) Int. Cl.
*F16H 3/66* (2006.01)

(52) U.S. Cl.
CPC ..... *F16H 3/666* (2013.01); *F16H 2200/0065* (2013.01); *F16H 2200/2012* (2013.01);
(Continued)

(58) Field of Classification Search
CPC .... F16H 3/66; F16H 3/666; F16H 2200/0065; F16H 2200/2012; F16H 2200/2046; F16H 2200/2097
See application file for complete search history.

(56) References Cited

U.S. PATENT DOCUMENTS

| 6,837,823 | B2* | 1/2005 | Lee ................... | F16H 3/66 475/276 |
| 8,241,171 | B2* | 8/2012 | Gumpoltsberger ....... | F16H 3/66 475/269 |

(Continued)

FOREIGN PATENT DOCUMENTS

| JP | 4380572 B2 | 12/2009 |
| JP | 2013-204706 A | 10/2013 |

(Continued)

*Primary Examiner* — Derek D Knight
*Assistant Examiner* — David R Morris
(74) *Attorney, Agent, or Firm* — Morgan, Lewis & Bockius LLP

(57) ABSTRACT

A planetary gear train of an automatic transmission for a vehicle may include an input shaft receiving power from an engine, an output shaft configured to output power, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements, each of which is disposed at a position where one rotating element among twelve rotating elements including the first to twelfth rotating elements is selectively connected with another rotating element among the twelve rotating elements or disposed at a position where one rotating element among the twelve rotating elements is selectively connected to a transmission housing.

8 Claims, 2 Drawing Sheets

(52) U.S. Cl.
CPC ............... *F16H 2200/2046* (2013.01); *F16H 2200/2097* (2013.01)

(56) References Cited

U.S. PATENT DOCUMENTS

| | | | | |
|---|---|---|---|---|
| 8,657,717 | B2* | 2/2014 | Gumpoltsberger | F16H 3/66 475/280 |
| 8,727,929 | B2* | 5/2014 | Beck | F16H 3/666 475/280 |
| 9,285,014 | B2* | 3/2016 | Lippert | F16H 3/62 |
| 9,599,197 | B1* | 3/2017 | Park | F16H 3/66 |
| 2004/0121877 | A1* | 6/2004 | Lee | F16H 3/66 475/282 |
| 2015/0119186 | A1* | 4/2015 | Lippert | F16H 3/62 475/275 |
| 2015/0337925 | A1* | 11/2015 | Hoffman | F16H 3/66 475/275 |
| 2016/0333981 | A1* | 11/2016 | Hwang | F16H 3/66 |
| 2016/0341289 | A1* | 11/2016 | Kato | F16H 3/666 |

FOREIGN PATENT DOCUMENTS

| KR | 10-2012-0133578 A | 12/2012 |
|---|---|---|
| KR | 10-2013-0000173 A | 1/2013 |

* cited by examiner

FIG. 2

| Gear shift stage | Control element for gear shift operation | | | | | | Gear ratio | Ratio between gear shift stages | Span of gear ratio |
|---|---|---|---|---|---|---|---|---|---|
| | C1 | C2 | C3 | C4 | B1 | B2 | | | |
| D1 |  | ● |  |  | ● |  | 3.730 |  | 8.575 |
| D2 |  |  |  | ● | ● |  | 2.620 | 1.424 | |
| D3 |  | ● |  | ● |  |  | 1.818 | 1.441 | |
| D4 |  |  | ● | ● |  |  | 1.377 | 1.320 | |
| D5 |  | ● | ● |  |  |  | 1.000 | 1.377 | |
| D6 | ● | ● |  |  |  |  | 0.767 | 1.304 | |
| D7 | ● |  | ● |  |  |  | 0.651 | 1.178 | |
| D8 | ● |  |  |  |  | ● | 0.536 | 1.215 | |
| D9 |  |  | ● |  |  | ● | 0.435 | 1.232 | |
| REV |  |  | ● |  | ● |  | -3.423 |  | | ns
PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0129862 filed Sep. 14, 2015, the entire contents of which is incorporated herein for all purposes by this reference.

BACKGROUND OF THE INVENTION

Field of the Invention

The present invention relates to an automatic transmission for a vehicle, and more particularly, to a planetary gear train of an automatic transmission for a vehicle, which is capable of implementing nine forward speeds using a minimum number of configurations, improving power transmission performance and fuel efficiency by increasing a span of a gear shift ratio, and ensuring linearity of ratios between gear shift stages.

Description of Related Art

The recent increase in oil prices has caused carmakers to meet global demands of improving fuel efficiency.

Accordingly, research is being conducted on engines in terms of reducing weight and improving fuel efficiency by down-sizing, and research is also being conducted to ensure both drivability and competitiveness by maximizing fuel efficiency by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple speed stages, it is important to develop a planetary gear train capable of maximizing efficiency using a small number of components.

In this respect, recently, an eight-speed automatic transmission has been implemented, and research and development are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

In addition, because it is impossible to ensure linearity of ratios between gear shift stages in a case in which a span of a gear shift ratio of the eight-speed automatic transmission is increased to 9.0 or more, driving efficiency of the engine and drivability of the vehicle deteriorate.

Accordingly, there is a need for development of a highly efficient automatic transmission with gear shift stages for nine or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle which is capable of implementing gear shift stages for nine forward speeds and one reverse speed using a minimum number of configurations, improving power transmission performance and fuel efficiency by increasing a span of a gear shift ratio, and ensuring linearity of ratios between the gear shift stages.

According to various aspects of the present invention, a planetary gear train of an automatic transmission for a vehicle may include an input shaft receiving power from an engine, an output shaft configured to output power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, and six control elements disposed at positions where a rotating element is selectively connected with another rotating element or disposed at positions where rotating elements are selectively connected to a transmission housing, in which the input shaft may be directly connected with the second rotating element and simultaneously selectively connected with the third rotating element, the output shaft may be directly connected with the eleventh rotating element, the first rotating element may be directly connected with the tenth rotating element, the second rotating element may be directly connected with the seventh rotating element, the fourth rotating element may be directly connected with the transmission housing, the sixth rotating element may be directly connected with the twelfth rotating element, the eighth rotating element may be directly connected with the eleventh rotating element, and gear shift stages for at least nine forward speeds and at least one reverse speed may be implemented by operations of two control elements among the six control elements.

The second rotating element may be selectively connected with the fifth rotating element, the first rotating element may be selectively connected with the ninth rotating element, the fifth rotating element may be selectively connected with the ninth rotating element, the sixth rotating element may be selectively connected with the transmission housing, and the third rotating element may be selectively connected with the transmission housing.

The first, second, and third rotating elements may be a sun gear, a planet carrier, and a ring gear, respectively, the fourth, fifth, and sixth rotating elements may be a sun gear, a planet carrier, and a ring gear, respectively, the seventh, eighth, and ninth rotating elements may be a sun gear, a ring gear, and a planet carrier, respectively, and the tenth, eleventh, and twelfth rotating elements may be a sun gear, a planet carrier, and a ring gear, respectively.

According to various aspects of the present invention, a planetary gear train of an automatic transmission for a vehicle may include an input shaft receiving power from an engine, an output shaft outputting power changed in speed, a first planetary gear set including first, second, and third rotating elements, a second planetary gear set including fourth, fifth, and sixth rotating elements, a third planetary gear set including seventh, eighth, and ninth rotating elements, a fourth planetary gear set including tenth, eleventh, and twelfth rotating elements, six control elements disposed at positions where the rotating element may be selectively connected another rotating element or disposed at positions where the rotating elements are selectively connected to a transmission housing, a first rotating shaft including the first rotating element and the tenth rotating element, a second rotating shaft including the second rotating element and the seventh rotating element, and directly connected with the input shaft, a third rotating shaft including the third rotating element, and selectively connected with the second rotating shaft or the transmission housing, a fourth rotating shaft including the fourth rotating element, and directly connected with the transmission housing, a fifth rotating shaft including the fifth rotating element, and selectively connected with the second rotating shaft, a sixth rotating shaft including the sixth rotating element and the twelfth rotating element, and selectively connected with the transmission housing, a seventh rotating shaft including the ninth rotating element, and selectively connected with the first rotating shaft and the fifth rotating shaft, and an eighth rotating shaft including the eighth rotating element and the eleventh rotating element, and directly connected with the output shaft.

The first planetary gear set may be a single pinion planetary gear set in which the first rotating element is a first sun gear, the second rotating element is a first planet carrier, and the third rotating element is a first ring gear, the second planetary gear set may be a single pinion planetary gear set in which the fourth rotating element is a second sun gear, the fifth rotating element is a second planet carrier, and the sixth rotating element is a second ring gear, the third planetary gear set may be a double pinion planetary gear set in which the seventh rotating element is a third sun gear, the eighth rotating element is a third ring gear, and the ninth rotating element is a third planet carrier, and the fourth planetary gear set may be a single pinion planetary gear set in which the tenth rotating element is a fourth sun gear, the eleventh rotating element is a fourth planet carrier, and the twelfth rotating element is a fourth ring gear.

The six control elements may include a first clutch selectively connecting the second rotating shaft and the fifth rotating shaft, a second clutch selectively connecting the second rotating shaft and the third rotating shaft, a third clutch selectively connecting the first rotating shaft and the seventh rotating shaft, a fourth clutch selectively connecting the fifth rotating shaft and the seventh rotating shaft, a first brake selectively connecting the sixth rotating shaft and the transmission housing, and a second brake selectively connecting the third rotating shaft and the transmission housing.

Gear shift stages implemented by selectively operating the six control elements may include a first forward gear shift stage implemented by simultaneously operating the second clutch and the first brake, a second forward gear shift stage implemented by simultaneously operating the fourth clutch and the first brake, a third forward gear shift stage implemented by simultaneously operating the second and fourth clutches, a fourth forward gear shift stage which is implemented by simultaneously operating the third and fourth clutches, a fifth forward gear shift stage which is implemented by simultaneously operating the second and third clutches, a sixth forward gear shift stage which is implemented by simultaneously operating the first and second clutches, a seventh forward gear shift stage which is implemented by simultaneously operating the first and third clutches, an eighth forward gear shift stage which is implemented by simultaneously operating the first clutch and the second brake, a ninth forward gear shift stage which is implemented by simultaneously operating the third clutch and the second brake, and a reverse gear shift stage which is implemented by simultaneously operating the third clutch and the first brake.

According to various aspects of the present invention, a planetary gear train of an automatic transmission for a vehicle may include an input shaft which receives power from an engine, an output shaft which outputs power changed in speed, a first planetary gear set which is a single pinion planetary gear set, and includes first, second, and third rotating elements, a second planetary gear set which is a single pinion planetary gear set, and includes fourth, fifth, and sixth rotating elements, a third planetary gear set which is a double pinion planetary gear set, and includes seventh, eighth, and ninth rotating elements, a fourth planetary gear set which is a single pinion planetary gear set, and includes tenth, eleventh, and twelfth rotating elements, a first rotating shaft including the first rotating element and the tenth rotating element, a second rotating shaft including the second rotating element and the seventh rotating element, and directly connected with the input shaft, a third rotating shaft including the third rotating element, and selectively connected with the second rotating shaft or the transmission housing, a fourth rotating shaft including the fourth rotating element, and directly connected with the transmission housing, a fifth rotating shaft including the fifth rotating element, and selectively connected with the second rotating shaft, a sixth rotating shaft including the sixth rotating element and the twelfth rotating element, and selectively connected with the transmission housing, a seventh rotating shaft including the ninth rotating element, and selectively connected with the first rotating shaft and the fifth rotating shaft, an eighth rotating shaft including the eighth rotating element and the eleventh rotating element, and directly connected with the output shaft, a first clutch selectively connecting the second rotating shaft and the fifth rotating shaft, a second clutch selectively connecting the second rotating shaft and the third rotating shaft, a third clutch selectively connecting the first rotating shaft and the seventh rotating shaft, a fourth clutch selectively connecting the fifth rotating shaft and the seventh rotating shaft, a first brake selectively connecting the sixth rotating shaft and the transmission housing, and a second brake selectively connecting the third rotating shaft and the transmission housing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective control elements applied to the exemplary planetary gear train according to the present invention.

Figure 1:
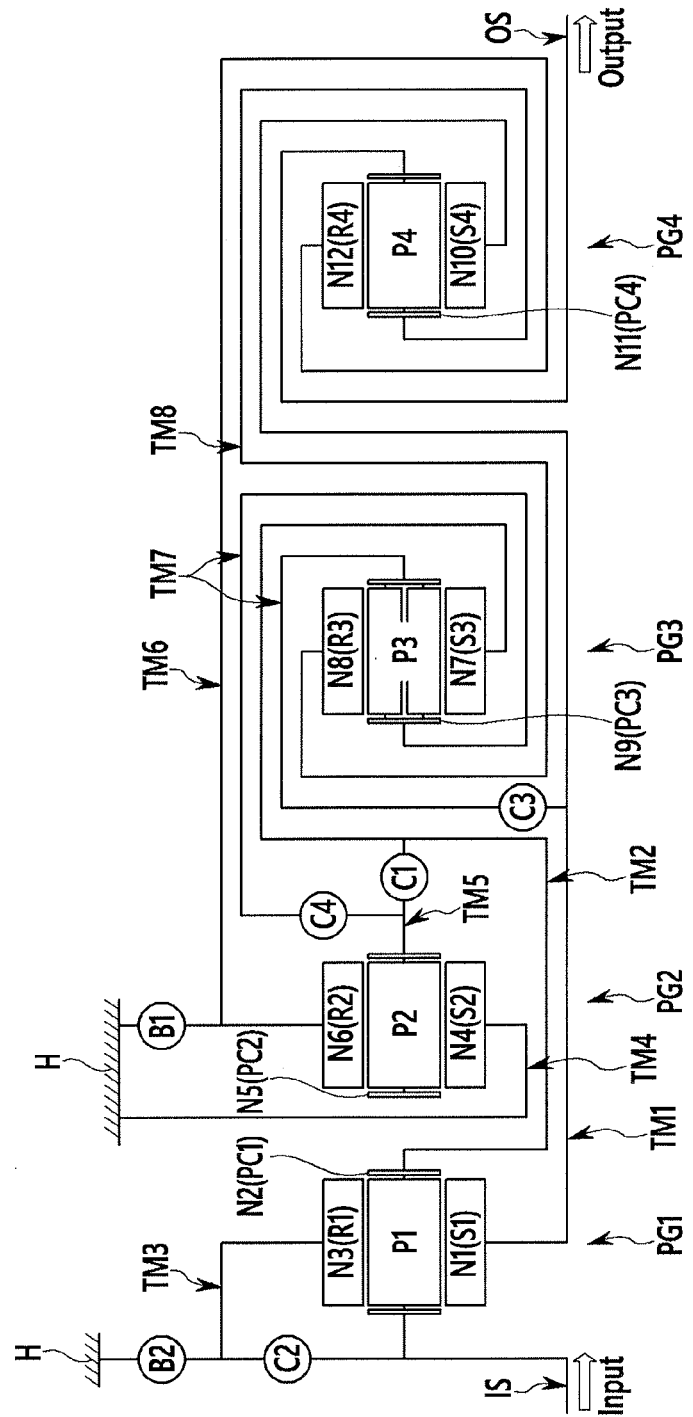
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of an exemplary planetary gear train according to various embodiments of the present invention.

Referring to FIG. 1, the planetary gear train according to various embodiments of the present invention includes first, second, third, and fourth planetary gear sets PG1, PG2, PG3, and PG4 which are coaxially disposed, an input shaft IS, an output shaft OS, eight rotating shafts TM1 to TM8 which directly connect respective rotating elements of the first, second, third, and fourth planetary gear sets PG1, PG2, PG3, and PG4, six control elements C1 to C3 and B1 to B3, and a transmission housing H.

Further, rotational power inputted from the input shaft IS is changed in speed by complementary operations of the first, second, third, and fourth planetary gear sets PG1, PG2, PG3, and PG4, and then outputted through the output shaft OS.

The respective simple planetary gear sets are disposed in the order of the first, second, third, and fourth planetary gear sets PG1, PG2, PG3, and PG4 from an engine.

The input shaft IS is an input member, rotational power from a crankshaft of the engine is converted into torque by a torque converter, and the torque is inputted.

The output shaft OS is an output member, and is disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N5 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a double pinion planetary gear set, and includes a third sun gear S3 which is a seventh rotating element N7, a third ring gear R3 which is an eighth rotating element N8 that internally engages with third pinions P3 that externally engage with the third sun gear S3 which is the seventh rotating element N7, and a third planet carrier PC3 which is a ninth rotating element N9 that supports the third pinions P3.

The fourth planetary gear set PG4 is a single pinion planetary gear set and includes a fourth sun gear S4 which is a tenth rotating element N10, a fourth planet carrier PC4 which is an eleventh rotating element N11 for supporting a fourth pinion P4 that externally engages with the fourth sun gear S4 that is the tenth rotating element N10, and a fourth ring gear R4 which is a twelfth rotating element N12 that internally engages with the fourth pinion P4.

The first, second, third, and fourth planetary gear sets PG1, PG2, PG3, and PG4 are operated while retaining a total of eight rotating shafts TM1 to TM8 in a state in which the first rotating element N1 is directly connected with the tenth rotating element N10, the second rotating element N2 is directly connected with the seventh rotating element N7, the sixth rotating element N6 is directly connected with the twelfth rotating element N12, and the eighth rotating element N8 is directly connected with the eleventh rotating element N11.

The configurations of the eight rotating shafts TM1 to TM8 will be described below.

The first rotating shaft TM1 includes the first rotating element N1 (the first sun gear S1) and the tenth rotating element N10 (the fourth sun gear S4).

The second rotating shaft TM2 includes the second rotating element N2 (the first planet carrier PC1) and the seventh rotating element N7 (the third sun gear S3), and is directly connected with the input shaft IS so as to always be operated as an input element.

The third rotating shaft TM3 includes the third rotating element N3 (the first ring gear R1), and is selectively connected to the second rotating shaft TM2 and simultaneously and selectively connected with the transmission housing H.

The fourth rotating shaft TM4 includes the fourth rotating element N4 (the second sun gear S2), and is directly connected with the transmission housing H.

The fifth rotating shaft TM5 includes the fifth rotating element N5 (the second planet carrier PC2), and is selectively connected with the second rotating shaft TM2.

The sixth rotating shaft TM6 includes the sixth rotating element N6 (the second ring gear R2) and the twelfth rotating element N12 (the fourth ring gear R4), and is selectively connected with the transmission housing H.

The seventh rotating shaft TM7 includes the ninth rotating element N9 (the third planet carrier PC3), and is selectively connected with the first rotating shaft TM1 and the fifth rotating shaft TM5.

The eighth rotating shaft TM8 includes the eighth rotating element N8 (the third ring gear R3) and the eleventh rotating element N11 (the fourth planet carrier PC4), and is directly connected with the output shaft OS so as to always be operated as an output element.

Further, the four clutches C1, C2, C3, and C4, which are control elements, are disposed at portions where the rotating shafts of the rotating shafts TM1 to TM8 are selectively connected to each other.

In addition, the two brakes B1 and B2, which are control elements, are disposed at portions where the rotating shafts of the rotating shafts TM1 to TM8 are selectively connected with the transmission housing H.

Positions at which the seven control elements C1 to C4 and B1 to B2 are disposed will be described below.

The first clutch C1 is disposed between the second rotating shaft TM2 and the fifth rotating shaft TM5, and allows the second rotating shaft TM2 and the fifth rotating shaft TM5 to be selectively integrated with each other.

The second clutch C2 is disposed between the second rotating shaft TM2 and the third rotating shaft TM3, and allows the second rotating shaft TM2 and the third rotating shaft TM3 to be selectively integrated with each other.

The third clutch C3 is interposed between the first rotating shaft TM1 and the seventh rotating shaft TM7, and allows the first rotating shaft TM1 and the seventh rotating shaft TM7 to be selectively integrated with each other.

The fourth clutch C4 is interposed between the fifth rotating shaft TM5 and the seventh rotating shaft TM7, and allows the fifth rotating shaft TM5 and the seventh rotating shaft TM7 to be selectively integrated with each other.

The first brake B1 is interposed between the sixth rotating shaft TM6 and the transmission housing H, and allows the fourth rotating shaft TM4 to be operated as a selectively fixed element.

The second brake B2 is interposed between the third rotating shaft TM3 and the transmission housing H, and allows the third rotating shaft TM3 to be operated as a selectively fixed element.

The control elements, which include the first, second, third, and fourth clutches C1, C2, C3, and C4 and the first and second brakes B1 and B2 as described above, may be a multi-plate hydraulic frictional coupling unit that is frictionally coupled by hydraulic pressure.

FIG. 2 is a table representing operations at respective gear shift stages implemented by respective control elements applied to the planetary gear train according to various embodiments of the present invention.

As illustrated in FIG. 2, according to the planetary gear train according to various embodiments of the present invention, gear shift operations are carried out by operating the three control elements at respective gear shift stages.

At a gear shift stage for a first forward speed D1, the second clutch C2 and the first brake B1 are operated simultaneously. Therefore, in a state in which the second rotating shaft TM2 and the third rotating shaft TM3 are connected to each other by the operation of the second clutch C2, power is inputted to the second rotating shaft TM2. Further, the gear shift operation for the first forward speed is carried out while the fourth rotating shaft TM4 is continuously operated as a fixing element and the sixth rotating shaft TM6 is operated as a fixing element by the operation of the first brake B1, and the power is outputted through the output shaft OS including the eighth rotating shaft TM8.

At a gear shift stage for a second forward speed D2, the fourth clutch C4 and the first brake B1 are operated simultaneously. Therefore, in a state in which the fifth rotating shaft TM5 and the seventh rotating shaft TM7 are connected to each other by the operation of the fourth clutch C4, power is inputted to the second rotating shaft TM2. The gear shift operation for the second forward speed is carried out while the fourth rotating shaft TM4 is continuously operated as a fixing element and the sixth rotating shaft TM6 is operated as a fixing element by the operation of the first brake B1, and the power is outputted through the output shaft OS including the eighth rotating shaft TM8.

At a gear shift stage for a third forward speed D3, the second and fourth clutches C2 and C4 are operated simultaneously. Therefore, in a state in which the second rotating shaft TM2 and the third rotating shaft TM3 are connected to each other by the operation of the second clutch C2 and the fifth rotating shaft TM5 and the seventh rotating shaft TM7 are connected to each other by operation of the fourth clutch C4, and power is inputted to the second rotating shaft TM2.

The gear shift operation for the third forward speed is carried out while the fourth rotating shaft TM4 is continuously operated as a fixing element and the power is outputted through the output shaft OS including the eighth rotating shaft TM8

At a gear shift stage for a fourth forward speed D4, the third and fourth clutches C3 and C4 are operated simultaneously. Therefore, in a state in which the first rotating shaft TM1 and the seventh rotating shaft TM7 are connected to each other by the operation of the third clutch C3, and the fifth rotating shaft TM5 and the seventh rotating shaft TM7 are connected to each other by operation of the fourth clutch C4, power is inputted to the second rotating shaft TM2. The gear shift operation for the fourth forward speed is carried out while the fourth rotating shaft TM4 is continuously operated as a fixing element and the power is outputted through the output shaft OS including the eighth rotating shaft TM8.

At a gear shift stage for a fifth forward speed D5, the second and third clutches C2 and C3 are operated simultaneously. Therefore, in a state in which the second rotating shaft TM2 and the third rotating shaft TM3 are connected to each other by the operation of the second clutch C2, and the first rotating shaft TM1 and the seventh rotating shaft TM7 are connected to each other by operation of the third clutch C3, power is inputted to the second rotating shaft TM2. The gear shift operation for the fifth forward speed is carried out while the fourth rotating shaft TM4 is continuously operated as a fixing element, and the power is outputted through the output shaft OS including the eighth rotating shaft TM8

At a gear shift stage for a sixth forward speed D6, the first and second clutches C1 and C2 are operated simultaneously. Therefore, in a state in which the second rotating shaft TM2 and the fifth rotating shaft TM5 are connected to each other by the operation of the first clutch C1, and the second rotating shaft TM2 and the third rotating shaft TM3 are connected to each other by operation of the second clutch C2, power is inputted to the second rotating shaft TM2. The gear shift operation for the sixth forward speed is carried out while the fourth rotating shaft TM4 is continuously operated as a fixing element, and the power is outputted through the output shaft OS including the eighth rotating shaft TM8.

At a gear shift stage for a seventh forward speed D7, the first and third clutches C1 and C3 are operated simultaneously. Therefore, in a state in which the second rotating shaft TM2 and the fifth rotating shaft TM5 are connected to each other by the operation of the first clutch C1, and the first rotating shaft TM1 and the seventh rotating shaft TM7 are connected to each other by operation of the third clutch C3, power is inputted to the second rotating shaft TM2. The gear shift operation for the seventh forward speed is carried out while the fourth rotating shaft TM4 is continuously operated as a fixing element, and the power is outputted through the output shaft OS including the eighth rotating shaft TM8.

At a gear shift stage for an eighth forward speed D8, the first clutch C1 and the second brake B2 are operated simultaneously. Therefore, in a state in which the second rotating shaft TM2 and the fifth rotating shaft TM5 are connected to each other by the operation of the first clutch C1, power is inputted to the second rotating shaft TM2. The gear shift operation for the eighth forward speed is carried out while the fourth rotating shaft TM4 is continuously operated as a fixing element and the third rotating shaft TM3 is operated as a fixing element by the operation of the second brake B2, and the power is outputted through the output shaft OS including the eighth rotating shaft TM8.

At a gear shift stage for a ninth forward speed D9, the third clutch C3 and second brake B2 are operated simultaneously. Therefore, in a state in which the first rotating shaft TM1 and the seventh rotating shaft TM7 are connected to each other by the operation of the third clutch C3, power is inputted to the second rotating shaft TM2. The gear shift operation for the ninth forward speed is carried out while the fourth rotating shaft TM4 is continuously operated as a fixing element and the third rotating shaft TM3 is operated as a fixing element by the operation of the second brake B2, and the power is outputted through the output shaft OS including the eighth rotating shaft TM8.

At a reverse gear shift stage REV, the third clutch C3 and the first brake B1 are operated simultaneously. Therefore, a reverse gear shift operation is carried out while the first rotating shaft TM1 is connected with the seventh rotating shaft TM7 by operation of the third clutch C3, and power is inputted to the second rotating shaft TM2. The reverse gear shift operation is carried out while the fourth rotating shaft TM4 is continuously operated as a fixing element and the sixth rotating shaft TM6 is operated as a fixing element by the operation of the first brake B1, and the power is outputted through the output shaft OS including the eighth rotating shaft TM8.

The planetary gear train according to various embodiments of the present invention may implement the gear shift stages for at least nine forward speeds and one reverse speed by operating and controlling the four planetary gear sets PG1, PG2, PG3, and PG4 using the four clutches C1, C2, C3 and C4 and the two brakes B1 and B2.

In addition, all ratios between the gear shift stages are 1.2 or more except for 6/7 forward gear shift stages, while ensuring linearity, thereby improving drivability such as acceleration before and after the gear shift operations, and a sense of rhythm of an engine speed.

In addition, a span of a gear shift ratio is 8.575 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
   an input shaft receiving power from an engine;
   an output shaft configured to output power;
   a first planetary gear set including first, second, and third rotating elements;
   a second planetary gear set including fourth, fifth, and sixth rotating elements;
   a third planetary gear set including seventh, eighth, and ninth rotating elements;
   a fourth planetary gear set including tenth, eleventh, and twelfth rotating elements; and
   six control elements, each of which is disposed at a position where one rotating element among twelve rotating elements including the first to twelfth rotating elements is selectively connected with another rotating element among the twelve rotating elements or disposed at a position where one rotating element among the twelve rotating elements is selectively connected to a transmission housing,
   wherein the input shaft is directly connected with the second rotating element and simultaneously selectively connected with the third rotating element,
   the output shaft is directly connected with the eleventh rotating element,
   the first rotating element is fixedly connected with the tenth rotating element,
   the second rotating element is fixedly connected with the seventh rotating element,
   the fourth rotating element is directly connected with the transmission housing,
   the sixth rotating element is directly connected with the twelfth rotating element,
   the eighth rotating element is directly connected with the eleventh rotating element, and
   gear shift stages for at least nine forward speeds and at least one reverse speed are implemented by operations of two control elements among the six control elements,
   wherein the first, second, and third rotating elements are a sun gear, a planet carrier, and a ring gear, respectively,
   wherein the fourth, fifth, and sixth rotating elements are a sun gear, a planet carrier, and a ring gear, respectively,
   wherein the seventh, eighth, and ninth rotating elements are a sun gear, a ring gear, and a planet carrier, respectively, and
   wherein the tenth, eleventh, and twelfth rotating elements are a sun gear, a planet carrier, and a ring gear, respectively.

2. The planetary gear train of claim 1, wherein:
   the second rotating element is selectively connected with the fifth rotating element,
   the first rotating element is selectively connected with the ninth rotating element,
   the fifth rotating element is selectively connected with the ninth rotating element,
   the sixth rotating element is selectively connected with the transmission housing, and
   the third rotating element is selectively connected with the transmission housing.

3. A planetary gear train of an automatic transmission for a vehicle, the planetary gear train comprising:
   an input shaft receiving power from an engine;
   an output shaft outputting power;
   a first planetary gear set including first, second, and third rotating elements;
   a second planetary gear set including fourth, fifth, and sixth rotating elements;
   a third planetary gear set including seventh, eighth, and ninth rotating elements;
   a fourth planetary gear set including tenth, eleventh, and twelfth rotating elements;
   six control elements, each of which is disposed at a position where one rotating element among twelve rotating elements including the first to twelfth rotating elements is selectively connected with another rotating element among the twelve rotating elements or disposed at a position where one rotating element among the twelve rotating elements is selectively connected to a transmission housing;

a first rotating shaft including the first rotating element and the tenth rotating element;

a second rotating shaft including the second rotating element and the seventh rotating element, and directly connected with the input shaft;

a third rotating shaft including the third rotating element, and selectively connected with the second rotating shaft or the transmission housing;

a fourth rotating shaft including the fourth rotating element, and directly connected with the transmission housing;

a fifth rotating shaft including the fifth rotating element, and selectively connected with the second rotating shaft;

a sixth rotating shaft including the sixth rotating element and the twelfth rotating element, and selectively connected with the transmission housing;

a seventh rotating shaft including the ninth rotating element, and selectively connected with the first rotating shaft and the fifth rotating shaft; and an eighth rotating shaft including the eighth rotating element and the eleventh rotating element, and directly connected with the output shaft, wherein the first planetary gear set is a single pinion planetary gear set in which the first rotating element is a first sun gear, the second rotating element is a first planet carrier, and the third rotating element is a first ring gear, wherein the second planetary gear set is a single pinion planetary gear set in which the fourth rotating element is a second sun gear, the fifth rotating element is a second planet carrier, and the sixth rotating element is a second ring gear, wherein the third planetary gear set is a double pinion planetary gear set in which the seventh rotating element is a third sun gear, the eighth rotating element is a third ring gear, and the ninth rotating element is a third planet carrier, and wherein the fourth planetary gear set is a single pinion planetary gear set in which the tenth rotating element is a fourth sun gear, the eleventh rotating element is a fourth planet carrier, and the twelfth rotating element is a fourth ring gear.

4. The planetary gear train of claim 3, wherein the six control elements include:

a first clutch selectively connecting the second rotating shaft and the fifth rotating shaft;

a second clutch selectively connecting the second rotating shaft and the third rotating shaft;

a third clutch selectively connecting the first rotating shaft and the seventh rotating shaft;

a fourth clutch selectively connecting the fifth rotating shaft and the seventh rotating shaft;

a first brake selectively connecting the sixth rotating shaft and the transmission housing; and a second brake selectively connecting the third rotating shaft and the transmission housing.

5. The planetary gear train of claim 4, wherein gear shift stages implemented by selectively operating the six control elements include:

a first forward gear shift stage implemented by simultaneously operating the second clutch and the first brake;

a second forward gear shift stage implemented by simultaneously operating the fourth clutch and the first brake;

a third forward gear shift stage implemented by simultaneously operating the second and fourth clutches;

a fourth forward gear shift stage which is implemented by simultaneously operating the third and fourth clutches;

a fifth forward gear shift stage which is implemented by simultaneously operating the second and third clutches;

a sixth forward gear shift stage which is implemented by simultaneously operating the first and second clutches;

a seventh forward gear shift stage which is implemented by simultaneously operating the first and third clutches;

an eighth forward gear shift stage which is implemented by simultaneously operating the first clutch and the second brake;

a ninth forward gear shift stage which is implemented by simultaneously operating the third clutch and the second brake; and a reverse gear shift stage which is implemented by simultaneously operating the third clutch and the first brake.

6. A planetary gear train of an automatic transmission for a vehicle, the planetary gear train comprising:

an input shaft which receives power from an engine;

an output shaft which outputs power;

a first planetary gear set which is a single pinion planetary gear set, and includes first, second, and third rotating elements;

a second planetary gear set which is a single pinion planetary gear set, and includes fourth, fifth, and sixth rotating elements;

a third planetary gear set which is a double pinion planetary gear set, and includes seventh, eighth, and ninth rotating elements;

a fourth planetary gear set which is a single pinion planetary gear set, and includes tenth, eleventh, and twelfth rotating elements;

a first rotating shaft including the first rotating element and the tenth rotating element wherein the first rotating element and the tenth rotating element are fixedly connected to the first rotating shaft;

a second rotating shaft including the second rotating element and the seventh rotating element, and directly connected with the input shaft wherein the second rotating element and the seventh rotating element are fixedly connected;

a third rotating shaft including the third rotating element, and selectively connected with the second rotating shaft or the transmission housing;

a fourth rotating shaft including the fourth rotating element, and directly connected with the transmission housing;

a fifth rotating shaft including the fifth rotating element, and selectively connected with the second rotating shaft;

a sixth rotating shaft including the sixth rotating element and the twelfth rotating element, and selectively connected with the transmission housing;

a seventh rotating shaft including the ninth rotating element, and selectively connected with the first rotating shaft and the fifth rotating shaft;

an eighth rotating shaft including the eighth rotating element and the eleventh rotating element, and directly connected with the output shaft;

a first clutch selectively connecting the second rotating shaft and the fifth rotating shaft;

a second clutch selectively connecting the second rotating shaft and the third rotating shaft;
a third clutch selectively connecting the first rotating shaft and the seventh rotating shaft;
a fourth clutch selectively connecting the fifth rotating shaft and the seventh rotating shaft;
a first brake selectively connecting the sixth rotating shaft and the transmission housing; and
a second brake selectively connecting the third rotating shaft and the transmission housing.

7. The planetary gear train of claim 6, wherein:
the first planetary gear set includes the first rotating element which is a first sun gear, the second rotating element which is a first planet carrier, and the third rotating element which is a first ring gear,
the second planetary gear set includes the fourth rotating element which is a second sun gear, the fifth rotating element which is a second planet carrier, and the sixth rotating element which is a second ring gear,
the third planetary gear set includes the seventh rotating element which is a third sun gear, the eighth rotating element which is a third ring gear, and the ninth rotating element which is a third planet carrier, and
the fourth planetary gear set includes the tenth rotating element which is a fourth sun gear, the eleventh rotating element which is a fourth planet carrier, and the twelfth rotating element which is a fourth ring gear.

8. The planetary gear train of claim 6, wherein gear shift stages implemented by selectively operating the four clutches and the two brakes include:
a first forward gear shift stage implemented by simultaneously operating the second clutch and the first brake;
a second forward gear shift stage implemented by simultaneously operating the fourth clutch and the first brake;
a third forward gear shift stage implemented by simultaneously operating the second and fourth clutches;
a fourth forward gear shift stage which is implemented by simultaneously operating the third and fourth clutches;
a fifth forward gear shift stage which is implemented by simultaneously operating the second and third clutches;
a sixth forward gear shift stage which is implemented by simultaneously operating the first and second clutches;
a seventh forward gear shift stage which is implemented by simultaneously operating the first and third clutches;
an eighth forward gear shift stage which is implemented by simultaneously operating the first clutch and the second brake;
a ninth forward gear shift stage which is implemented by simultaneously operating the third clutch and the second brake; and
a reverse gear shift stage which is implemented by simultaneously operating the third clutch and the first brake.

* * * * *